(12) United States Patent
Kim et al.

(10) Patent No.: US 9,967,776 B1
(45) Date of Patent: May 8, 2018

(54) IIDLE-MODE LOAD EQUALIZATION

(71) Applicant: Sprint Spectrum LP, Overland Park, KS (US)

(72) Inventors: Yun Sung Kim, Ashburn, VA (US); Dhaval Mehta, Aldie, VA (US); Pinal Tailor, Ashburn, VA (US); Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days. days.

(21) Appl. No.: 14/920,547

(22) Filed: Oct. 22, 2015

(51) Int. Cl.
| | |
|---|---|
| *H04W 28/08* | (2009.01) |
| *H04W 36/24* | (2009.01) |
| *H04W 72/08* | (2009.01) |
| *H04W 36/34* | (2009.01) |
| *H04W 76/06* | (2009.01) |
| *H04W 36/00* | (2009.01) |

(52) U.S. Cl.
CPC ....... *H04W 28/08* (2013.01); *H04W 36/0055* (2013.01); *H04W 76/06* (2013.01)

(58) Field of Classification Search
CPC ...... H04W 36/06; H04W 36/08; H04W 16/32
USPC .................................. 455/444, 446; 370/330
See application file for complete search history.

(56) References Cited

U.S. PATENT DOCUMENTS

| | | | |
|---|---|---|---|
| 8,718,704 B2 | 5/2014 | Khanka et al. | |
| 2003/0063624 A1* | 4/2003 | Nagarajan | H04L 12/5602 370/468 |
| 2007/0091785 A1* | 4/2007 | Lindoff | H04J 11/0069 370/203 |
| 2008/0130582 A1* | 6/2008 | Lee | H04W 36/30 370/332 |
| 2008/0320354 A1* | 12/2008 | Doppler | H04L 1/04 714/748 |
| 2009/0291644 A1* | 11/2009 | Suwa | H04B 1/005 455/77 |
| 2010/0093350 A1* | 4/2010 | Wang | H04J 11/0093 455/436 |
| 2010/0161824 A1* | 6/2010 | Viger | H04L 12/4633 709/231 |
| 2011/0319085 A1* | 12/2011 | Ishii | H04W 88/06 455/436 |
| 2012/0307780 A1* | 12/2012 | Mochizuki | H04L 1/1812 370/329 |
| 2013/0136027 A1* | 5/2013 | Matsuo | H04W 24/10 370/252 |
| 2013/0336110 A1 | 12/2013 | Sridhar et al. | |
| 2013/0337821 A1* | 12/2013 | Clegg | H04L 5/0062 455/452.1 |

(Continued)

FOREIGN PATENT DOCUMENTS

WO   2014/182209 A1   11/2014

*Primary Examiner* — Parth Patel
*Assistant Examiner* — Jason Harley (57) ABSTRACT

Embodiments disclosed herein provide individual idle-mode cell reselection priority lists to wireless devices dynamically, based on real-time load conditions for frequency bands deployed within a wireless network. Load equalization operations include classifying frequency bands into congested, target, or non-congested bands, grouping similar bands, comparing loads across the various bands in to a threshold, and adjusting the priority of each frequency band accordingly. The adjusted priorities are transmitted to each wireless device as the wireless device enters idle mode.

18 Claims, 6 Drawing Sheets

(56) References Cited

U.S. PATENT DOCUMENTS

| | | | |
|---|---|---|---|
| 2015/0181537 A1* | 6/2015 | Ogura | H04W 52/243 |
| | | | 455/522 |
| 2016/0044537 A1* | 2/2016 | Macias | H04W 48/12 |
| | | | 370/236 |
| 2016/0073312 A1* | 3/2016 | Sridhar | H04W 48/16 |
| | | | 370/235 |

* cited by examiner

IIDLE-MODE LOAD EQUALIZATION

TECHNICAL BACKGROUND

As wireless networks evolve and grow, combinations of older and newer technologies may be implemented within a single wireless network. For instance, a heterogeneous network can be configured to include various types of access nodes such as a higher power access node (macro cells) as well as one or more smaller, lower power network access nodes (small cells), such as microcells, femtocells, picocells, Home evolved Node Bs (HeNBs), and Enterprise evolved Node Bs (EeNBs). Further, each access node in the wireless network may provide or "deploy" one or more air-interface frequency bands for serving wireless devices on the network. For example, a particular small cell access node may deploy a different air-interface frequency bared than is being used by the macro cell. A macro cell may deploy three different frequency bands, and a neighboring macro cell with an overlapping range may serve two of the three frequency bands. The plurality of frequency bands served in the same area enable user equipment (UE) such as wireless devices to select specific frequency bands depending upon congestion, usage, application type, etc. However, current methods for load balancing between frequency bands are inefficient, particularly when wireless devices resume activity from idle mode.

OVERVIEW

Exemplary embodiments described herein include systems, methods, and nodes for mitigating interference in heterogeneous networks. For instance, a method for adaptive idle-mode load equalization within a wireless network includes determining that a first load of a first frequency band in the wireless network exceeds a first load threshold, adjusting a cell reselection priority table such that a priority of the first frequency band is lower than a priority of a second frequency band in the network, and transmitting the cell reselection priority table to a user equipment prior to the user equipment entering an idle state. Upon resuming from the idle state, the user equipment connects to the wireless network using the second frequency band.

A system for adaptive idle-mode load equalization within a wireless network includes a processing node configured to determine that a load of a first frequency band deployed by a serving node in a wireless network exceeds a load threshold, obtain average load measurements of one or more additional frequency bands in the wireless network, define a relative priority for each of the first frequency band and said one or more additional frequency bands such that a priority of the first frequency band is relatively lower than a priority of a second frequency band that has a smaller load from among said one or more additional frequency bands in the network, and transmit the relative priority for each frequency band to a user equipment prior to the user equipment entering an idle state.

A processing node for adaptive idle-mode load equalization within a wireless network performs operations including determining a congested frequency band from among a plurality of frequency bands in a wireless network, adjusting a reselection priority of at least one of the plurality of frequency bands based on real-time load measurements of the plurality of frequency bands, and transmitting the reselection priority of each of the plurality of frequency bands to a wireless device.

DETAILED DESCRIPTION

Generally, wireless devices or user equipment (UE) that are forced to select certain frequency bands upon resuming from idle, sometimes result in too many wireless devices attempting to access an already congested frequency band. The embodiments disclosed herein describe novel systems, methods, and nodes for idle-mode cell reselection (IMCR) by providing individual IMCR band priority lists to wireless devices dynamically, based on real-time load conditions for frequency bands deployed within a wireless network. Load equalization/IMCR operations disclosed herein dynamically manage traffic across a plurality of frequency bands served by a plurality of access nodes, including the various access nodes found in a heterogeneous network (HetNet). Different frequency bands may be classified into types of frequency bands, such as congested bands (CB), target bands (TB), non-congested bands (NB), etc. Frequency bands may be grouped into CB, TB, and NB groups. Further, traffic-management thresholds for each frequency band may be stored in a priority list or table, and distributed across each co-located access node or cell in the wireless network.

When a congested band is detected, for example via physical resource block (PRB) utilization metrics, number of connected users, or any other load-determination technique, the IMCR operations are triggered. These operations include comparing loads across the various frequency bands in the network to a threshold, and adjusting the priority of each frequency band accordingly. The adjusted priorities are transmitted to each wireless device as the wireless device enters idle mode. For example, the adjusted priority table may be transmitted to the wireless device in a connection release message such as using idle-mode mobility control information (IMMCI) in an RRC_Release message. Such IMMCI information overrides any existing or past priority information that may have been pushed to the wireless device in a broadcast system message such as a system information block (SIB) message. Further, the updated priority is submitted to each wireless device on an individual basis, versus broadcast.

A wireless communication network can comprise a plurality of frequency bands, for example, 800 MHz, 1.96 Hz, 2.5 GHz, and the like. Frequency bands can comprise one or more channels, which comprise a subset of the range of frequencies in a frequency band. The subset of the range of frequencies in a frequency band can be referred to as a bandwidth or a channel bandwidth. For example, the 2.56 Hz frequency band can comprise one or more channels of 20 MHz channel bandwidth, and the 1.9 GHz frequency band can comprise one or more channels of 5 MHz channel bandwidth. Generally, a channel with a greater bandwidth can provide a higher data rate or a higher throughput than a channel with a smaller bandwidth For example, a macrocell in a wireless network may have deployed an 800 MHz band, a 1900 MHz band, and a 2.5 GHz band. A default priority list may assign a lower priority to the 800 MHz band, a medium priority to the 1900 MHz band, and a high priority to the 2.5 GHz band. However, the macrocell may determine that the 2.5 GHz band is congested via, for instance, a plurality of signal measurements. To prevent any wireless devices that are in idle mode from attempting to connect to the high-priority 2.5 GHz band when the wireless device resumes from idle mode (thereby increasing congestion), the macrocell may instead adjust the priority list such that the 2.5 GHz band is assigned a priority that is relatively lower than a priority of the other two frequency bands. In this case, when a wireless device attempts to resume a connection from idle mode, the wireless devices is forced to access one of the other two frequency bands. The adjusted or updated priority list is transmitted to the wireless device as the wireless device is released into idle mode.

The method can iteratively repeat such traffic management in real-time using measurements of each frequency band, until the load is equalized and the congestion in all frequency hands is resolved or minimized. Further, the load equalization and traffic management operations disclosed herein may be applied to multiple combinations of access points and frequency bands deployed therefrom, as described in the additional exemplary embodiments depicted herein.

Figure 1:
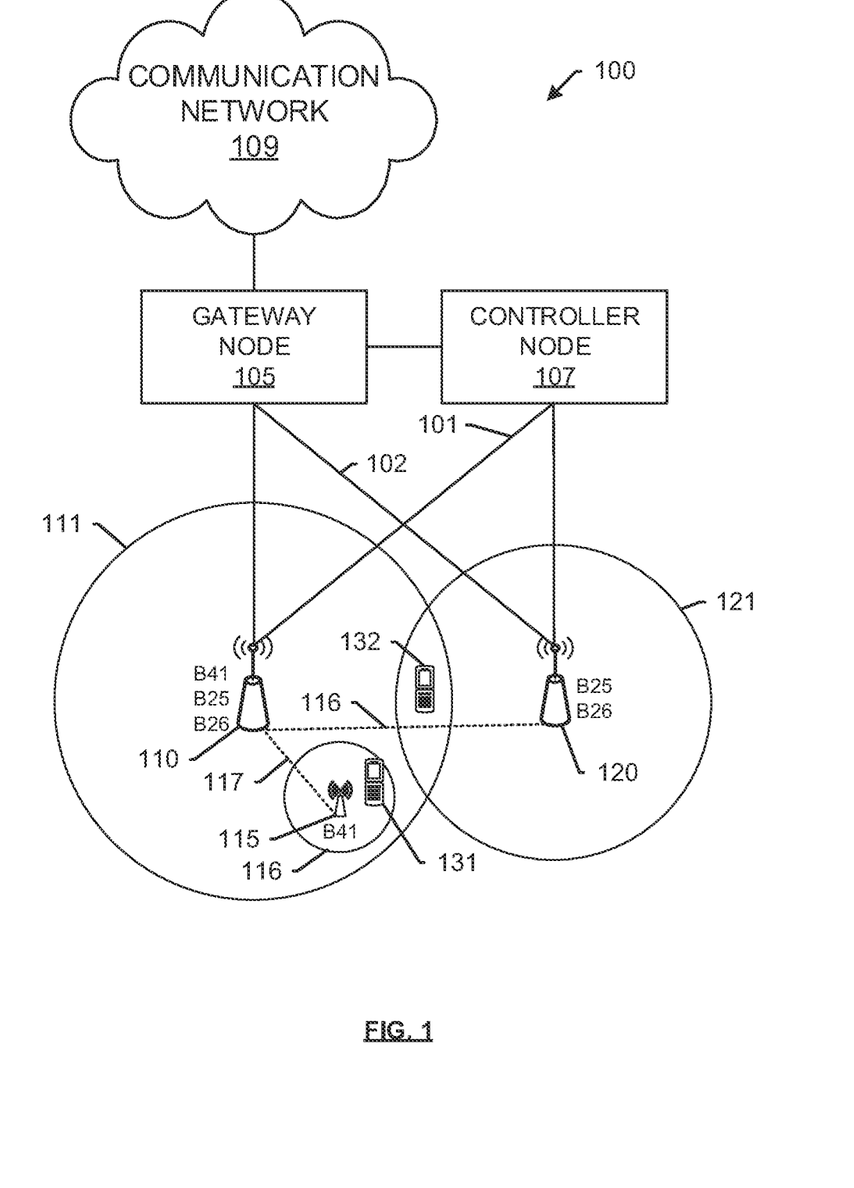
FIG. 1 illustrates an exemplary communication system for load equalization.

FIG. 1 illustrates an exemplary communication system for load equalization. Communication system 100 can comprise access nodes 110, 115, and 120 connected to gateway node 105 and controller node 107 via communication links 101 and 102, with gateway node 105 providing access to a communication network 109, and access nodes 110, 115, 120 providing wireless service to wireless devices 131 and 132. Other network elements may be present in the communication system 100 to facilitate communication but are omitted for clarity, such as base stations, base station controllers, mobile switching centers, dispatch application processors, and location registers such as a home location register or visitor location register. Furthermore, other network elements may be present to facilitate communication, such as between access nodes 110, 115, 120 and communication network 109 that are omitted for clarity, including additional processing nodes, controller nodes, routers, gateways, and physical and/or wireless data links for carrying data, among the various network elements.

Communication network 109 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 109 can be capable of carrying data, for example, to support voice, push-to-talk, broadcast video, and data communications by wireless devices 131, 132. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 109 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 109 can also comprise additional base stations, controller nodes, telephony switches, internet routers, network gateways, computer systems, communication links, or some other type of communication equipment, and combinations thereof.

Communication links 101, 102 can use various communication media, such as air, space, metal, optical fiber, or some other signal propagation path—including combinations thereof. Communication links 101, 102 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 101, 102 may include S1 communications links. Other wireless protocols can also be used. Communication links 101, 102 can be a direct link or might include various equipment, intermediate components, systems, and networks, Communication links 101, 102 may comprise many different signals sharing the same link Gateway node 105 can be any network node configured interface with other network nodes using various protocols. Gateway node 105 can communicate user data over system 100. Gateway node 105 can be a standalone computing device, computing system, or network component, and can be accessible, for example, by a wired or wireless connection, or through an indirect connection such as through a computer network or communication network. For example, gateway node 105 can include a serving gateway (SGW) and/or a public data network gateway (PGW), etc. One of ordinary skill in the art would recognize that gateway node 105 is not limited to any specific technology architecture, such as Long Term Evolution (LTE) and can be used with any network architecture and/or protocol.

Gateway node 105 can comprise a processor and associated circuitry to execute or direct the execution of computer-readable instructions to obtain information. Gateway node 105 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 105 can receive instructions and other input at a user interface.

Controller node 107 can be any network node configured to communicate information and/or control information over system 100. Controller node 107 can be configured to transmit control information associated with a handover procedure. Controller node 107 can be a standalone computing device, computing system, or network component, and can be accessible, for example, by a wired or wireless connection, or through an indirect connection such as through a computer network or communication network. For example, controller node 107 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 107 is not limited to any specific technology architecture, such as Long Term Evolution (LIE) and can be used with any network architecture and/or protocol.

Controller node 107 can comprise a processor and associated circuitry to execute or direct the execution of computer-readable instructions to obtain information. Controller node 107 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 115, 120 can be any network nodes configured to provide communication between wireless devices 131, 132 and communication network 109. Access nodes 110, 115, 120 can be standard access nodes and/or short range, low power, small access nodes. In an exemplary embodiment, access node 115 can be a small access node within a coverage area 111 of access node 110, where access node 110 can be a standard access node. A standard access node can be a macrocell access node such as a base transceiver station, a radio base station, an eNodeB device, or an enhanced eNodeB device, or the like. In an exemplary embodiment, a macrocell access node such as access node 110 or 120 can have a coverage area 111 in the range of approximately five kilometers to thirty five kilometers and an output power in the tens of watts. A small access node such as access node 131 can include a macrocell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. Moreover, it is noted that while access nodes 110, 115, 120 are illustrated in FIG. 1, any number of access nodes can be implemented within system 100.

Access nodes 110, 115, 120 can comprise a processor and associated circuitry to execute or direct the execution of computer-readable instructions to obtain information. Access nodes 110, 115, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 115, 120 can receive instructions and other input at a user interface. Access nodes 110, 115, 120 communicate with gateway node 105 and controller node 107 via communication links 101, 102. Further, access nodes 110, 115, 120 may communicate with each other wirelessly or via communications links 116, 117. For instance, communication links 116, 117 may be X2 links.

Access nodes 110, 115, 120 each deploy one or more frequency bands from among 800 MHz (band 26, or B26), 1.9 GHz (band 25, or B25), and 2.5 GHz (band 41, or B41). In an embodiment, bands 25 and 26 may use Frequency Division Duplex Long Term Evolution (FDD-LTE), and band 41 may use Time Division Duplex Long Term Evolution (TDD-LTE). Other combinations of access nodes and frequency bands are possible, and may be within the purview of those having ordinary skill in the art at the time of this disclosure. In the present embodiment, access node 110 is serving at least wireless devices 131 and 132 using one of frequency bands 1326, B25, or B41. Small access node 115 may be serving wireless device 131 using frequency band B41. Access node 110 has a coverage area 111 that encompasses sub-cell access node 115. At least a portion of the coverage area 121 of sub-cell access node 120 is contained within the coverage area 111 of access node 110. Within this coverage area 121, sub-cell access node 120 may be serving wireless device 131 and wireless device 132.

Wireless devices 131, 132 may be any device, system, combination of devices, or other such communication platform capable of communicating wirelessly with access nodes 110, 115, 120 using one of frequency bands B26, B25, B41 deployed by one or more of access nodes 110, 115, 120. Wireless devices 131, 132, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 115, 120. Other types of communication platforms are possible.

In operation, wireless device 131 is located within coverage area 111 of access node 110, and within coverage area 116 of access node 115. In other words, because coverage area 116 is contained within coverage area 111, wireless device 131 is also located within coverage area 111. Wireless device 132 is located within coverage area 111 of access node 110 and within coverage area 121 of access node 120, in an overlapping region between coverage areas 111 and 121. Thus, it should be understood that wireless device 131 is being served by band 1341 deployed by either access node 110 or 115, or by bands 25 or 26 deployed by access node 115. Wireless device 132 is being served either by one of bands B25, B26 deployed by one of access nodes 111, 121, or by band B41 deployed by access node 111.

Each wireless device 131, 132 is provisioned with a cell reselection priority table, such that if the wireless device 131, 132 enters an idle state, it resumes from idle and connects with the highest-priority cell or frequency band. According to the present embodiment, individual IMCR band priority lists are provided to each wireless device 131, 132 dynamically, upon the wireless device 131, 132 going into an idle state. Generally, the priority list may be stored as a default priority list, depending on the requirements of the network operator. For instance, band B41 may have the highest priority, as the network operator desires that more devices connect to B41. Similarly, band B26 may have the lowest priority for several reasons. However, these default priorities may be modified or adjusted based on real-time load conditions for each frequency band B41, B25, B26 deployed by one or more of access nodes 110, 115, 120. When a congested band is detected, for example via, physical resource block (PRB) utilization metrics, number of connected users, or any other load-determination technique, loads across the various bands may be compared with a load threshold, and the priority of each band adjusted accordingly. Depending on load measurements, each frequency band B26, B25, B41 may be classified into a band type, such as congested bands (CB), target bands (TB), non-congested bands (NB). The load thresholds for each band may be stored in the priority list, and distributed across each access node 110, 115, 120.

In an embodiment, wireless device 131 may be served by band B41 deployed by access node 115. In this example, a default priority may assign a high priority to band B41 and medium/low priorities to bands B25 and B26; however, access node 115 may determine that band B41 is congested via, for instance, a plurality of signal measurements. If wireless device 131 enters an idle state, it would resume and attempt to connect to any node offering band B41. To avoid this scenario, access node 115 may adjust the priorities for each band in a priority table, and transmit the priority table to wireless device 131 as wireless device 131 enters the idle state. The priorities may be adjusted such that band B41 is assigned a priority that is relatively lower than a priority of the either or both bands B25 or B26. The priority may be adjusted based on measurement of load across all the bands. For instance, access node 115 may determine an average load across each of bands B25 and B26, and assign new priorities to each of bands B25, B26, and B41, such that the priorities correspond to the respective average load of each band. Further, if it is determined that one of bands B25 or B26 is also congested, then the congested bands may be grouped together, and their priorities adjusted in unison, as further described with respect to FIG. 3. Similarly, non-congested bands are identified, and grouped as necessary.

The adjusted priority table may be transmitted to wireless device 131 as it enters an idle mode. For example, the adjusted priority table may be transmitted to wireless device 131 via idle-mode mobility control information (IMMCI) in an RRC_Release message. Such IMMCI information overrides any existing or past priority information that may have been pushed to wireless device 131 in a prior system information block (SIB) message. Therefore, when wireless device 131 attempts to resume a connection from idle mode, it is directed to access one of the non-congested bands, either B26 or B25 deployed by access node 110. The priority table may further revert to the default priorities after a time period or after congestion has resolved, so as to maintain the wireless network operator's priority preference, and assuming that over time, congestion will be resolved. Alternatively or in addition, the priority table may revert to a default priority upon determining that congestion is actually resolved. For instance, the priority table may be iteratively adjusted using real-time measurements of each band, until the load is equalized and the congestion in all bands is resolved or minimized. The determination of a congestion being overcome may further rely on a second threshold that is higher than the first load threshold used to determine congestion, i.e. a hysteresis threshold. The hysteresis threshold allows for a congestion determination to exceed the first congestion determination, so as to ensure that the congestion is actually resolved, and to minimize repeated and unnecessary adjustment to the priority table.

In another embodiment, wireless device 132 may be served by band B41 deployed by access node 110. In this example, a default priority may assign a high priority to band B41 and medium/low priorities to bands B25 and B26; however, access node 110 may determine that band B41 is congested via, for instance, a plurality of signal measurements. If wireless device 132 enters an idle state, it would resume and attempt to connect to any node offering band B41. To avoid this scenario, access node 120 may adjust the priorities for each band in a priority table, and transmit the priority table to wireless device 132 as wireless device 132 enters the idle state. The priorities may be adjusted such that band B41 is assigned a priority that is relatively lower than a priority of the either or both bands B25 or B26. The priority may be adjusted based on a measurement of load across all the bands. For instance, access node 110 may determine an average load across each of bands B25 and B26, and assign new priorities to each of bands B25, B26, and B41, such that the priorities correspond to the respective average load of each band. Further, if it is determined that one of bands B25 or B26 is also congested, then the congested bands may be grouped together, and their priorities adjusted in unison, as further described with respect to FIG. 3. Similarly, non-congested bands are identified, and grouped as necessary.

Alternatively or in addition, a repeated measurement may be performed of the load of the current cell or band, and it may be determined that band B41 is now loaded below a threshold, i.e. not congested. The priority may be adjusted accordingly. In either case, the adjusted priority table is transmitted to wireless device 132 as it enters an idle mode, for example, via idle-mode mobility control information (IMMCI) in an RRC_Release message. Therefore, when wireless device 132 attempts to resume a connection from idle mode, it is directed to access one of the non-congested bands, either B26, B25, or B41 deployed by either access node 110, or access node 115. The priority table may further revert to the default priorities after a time period or after congestion has resolved, as described herein.

In another embodiment, wireless device 131 may be served by band B26 deployed by access node 110. In this example, a default priority may assign a high priority to band B41, a medium priority to band 25, and a low priority to band B26. Therefore, a wireless device resume from an idle state would attempt to connect to any node offering band B41. However, access node 110 may determine that band B41 is congested via, for instance, a plurality of signal measurements. To avoid congestion, access node 110 may adjust the priorities for each band in a priority table, and transmit the priority table to wireless device 131 as wireless device 131 enters the idle state. The priorities may be adjusted such that band B41 is assigned a priority that is relatively lower than a priority of the either or both bands B25 or B26. The priority may be adjusted based on a measurement of load across all the bands. For instance, access node 110 may determine an average load across each of bands B25 and B26, and assign new priorities to each of bands B25, B26, and B41, such that the priorities correspond to the respective average load of each band. Further, if it is determined that one of bands B25 or B26 is also congested, then the congested bands may be grouped together, and their priorities adjusted in unison, as further described with respect to FIG. 3. For example, bands B41 and B25 may be determined to be congested, such that they are grouped in a CB group and prioritized relatively lower than band B26. Similarly, non-congested bands are identified, and grouped as necessary. Alternatively or in addition, a repeated measurement may be performed of the load of the current cell or band, and it may be determined that band B41 is now loaded below a threshold, i.e. not congested. The priority may be adjusted accordingly. In either case, the adjusted priority table is transmitted to wireless device 131 as it enters an idle mode, for example, via idle-mode mobility control information (IMMCI) in an RRC_Release message. Therefore, when wireless device 131 attempts to resume a connection from idle mode, it is directed to access non-congested band B26 again, deployed by either access node 110, or access node 115. The priority table may further revert to the default priorities after a time period or after congestion has resolved, as described herein.

Although the determinations of congestion and priority adjustment operations have been described above with reference to the respective access nodes performing the operations, these operations may be performed by any other entity in system 100. For instance, priority adjustments may be performed by controller node 107 and communicated to each access node 110, 115, 120. Further, these operations may be performed independently at different entities, so long as the result of transmitting updated priorities to wireless devices 131, 132 as they are going idle, are achieved.

Figure 2:
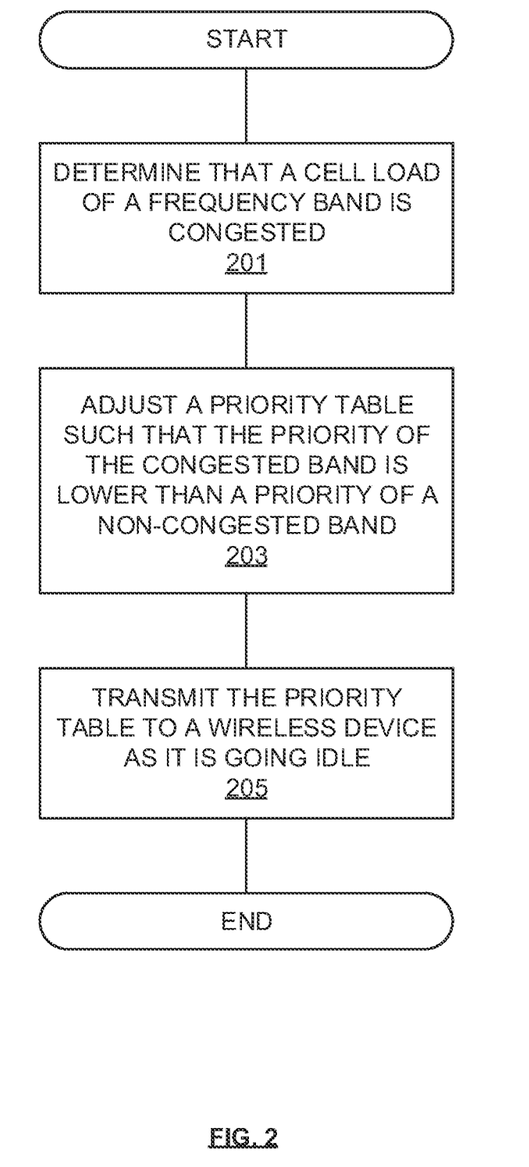
FIG. 2 illustrates an exemplary method for load equalization.

FIG. 2 illustrates an exemplary method for load equalization. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 201, a determination is made that a cell load of a frequency band, such as one of frequency bands B26, B25, B41, is congested. For the purposes of the subject disclosure, a frequency band is congested if a single carrier within that frequency band is congested. For example, frequency band B26 may be deployed on 3 carriers on a single access node. If one of the 3 carriers is congested, then the entire band is determined to be a congested band (CB). The reason for this is that existing load balancing methods already attempt to keep the congestion between carriers below a threshold, and existing cell sites may already be performing such load balancing between carriers. While the same frequency band across multiple carriers may have the same propagation characteristics, different frequency bands have different propagation characteristics, and the existing methods are inefficient at load equalization across different frequency bands. Therefore, the subject disclosure focuses on load equalization across different frequency bands, while leaving load equalization across different carriers to existing methods that may already be implemented within wireless networks. Moreover, determination 201 of a congested band may be performed via physical resource block (PRB) utilization metrics, number of connected users, or any other load-determination technique. Load equalization operations performed here include measuring and classifying different frequency bands into types of bands, comparing loads across the various bands in the network to a threshold, and determining whether or not to adjust the priority of the frequency bands, as further described with regards to FIG. 3.

Referring back to FIG. 2, a priority table is adjusted in 203 such that the priority of the CB or CB group is lower than a priority of a NB or NB group. Tables 1 and 2 below depict relative adjustment of priorities of each band in various combinations of congested and non-congested states.

TABLE 1

One congested frequency band among three

| | Default | | | Case #1 | | | Case #2 | | | Case #3 | | |
| --- | --- | --- | --- | --- | --- | --- | --- | --- | --- | --- | --- | --- |
| | B26 N | B25 N | B41 N | B26 N | B25 C | B41 N | B26 C | B25 N | B41 N | B26 N | B25 N | B41 C |
| B41 | 6(++) | 6(+) | 6(=) | + | ++ | = | ++ | + | = | − | −− | = |
| B25 | 5(+) | 5(=) | 5(−) | − | = | −− | + | = | − | + | = | ++ |
| B26 | 4(=) | 4(−) | 4(−−) | = | + | − | = | − | −− | = | − | + |

The default priorities (i.e. when none of the bands are congested) are numbered as 4, 5, and 6. Any other designation is possible. As shown in Table 1, band B41 ($4^{th}$ row) has a default priority of 6(++) relative to band B26 ($2^{nd}$ col.), where the (++) designates the relative value of the priority. Similarly, band B41 has a default priority of 6(+) relative to band B25, and (6=) relative to band B41, i.e. itself. When band B25 is determined to be congested (case #1), band B41 is adjusted to be a single value relatively higher than band B26, and two values relatively higher than band B25, as indicated by the + and ++ respectively. Likewise, band B25 is "demoted" or lowered in priority by one value relative to band B26, and two values relative to band B41. The resulting priorities in case #1 are B25=4, B26=5, and B41=6. In other words, the positions of bands B25 and B26 are switched in the new priority table. Similar adjustments are made for case #2, where band B26 congestion results in no change from default, and for case #3, where band B41 is congested, resulting in band B41 being demoted to the bottom of the list.

TABLE 2

Two congested frequency bands among three

| | Default | | | Case #1 | | | Case #2 | | | Case #3 | | |
| --- | --- | --- | --- | --- | --- | --- | --- | --- | --- | --- | --- | --- |
| | B26 N | B25 N | B41 N | B26 N | B25 C | B41 C | B26 C | B25 N | B41 C | B26 C | B25 C | B41 N |
| B41 | 6(++) | 6(+) | 6(=) | − | = | = | = | − | = | + | + | = |
| B25 | 5(+) | 5(=) | 5(−) | − | = | = | + | = | + | = | = | − |
| B26 | 4(=) | 4(−) | 4(−−) | = | + | + | = | − | = | = | = | − |

Table 2 depicts cases where two frequency bands may be determined to be CBs. The default priorities are the same, i.e. B41=6, B25=5, and B26=4. In case #1, B25 and B41 are both determined to be congested. In this case, the relative priorities of both bands B41 and B25 relative to B26 are lowered by a single value, such that the relative priority of band B26 relative to both bands B25 and B41 is higher by a single value. The priorities of bands B41 and B25 in case #1 may continue to remain the same relative to each other; i.e. band B41 is a higher priority than band B25—even as both bands are congested. Similarly, in case #2 where bands B26 and B41 are determined to be congested, a relative priority of non-congested band B25 is increased. It is important to note that within each group, i.e. congested bands group or non-congested bands group, the priority relative to each band within the group remains the same. Alternatively, all bands within a congested group or non-congested group may be assigned the same priority, so long as their relative priority to other bands outside the group is adjusted to reflect the congested vs. non-congested status.

In 205, the adjusted priorities are transmitted to each wireless device as the wireless device enters idle mode. For example, the adjusted priority table may be transmitted to the wireless device via idle-mode mobility control information (IMMCI) in an RRC_Release message. Such IMMCI information overrides any existing or past priority information that may have been pushed to the wireless device in a system information block (SIB) message. Further, the updated priority is submitted to each wireless device on an individual basis, versus broadcast. When a wireless device attempts to resume a connection from idle mode, the wireless devices is forced to access one of the other two bands. The adjusted or updated priority list is transmitted to the wireless device as the wireless device is released into idle mode. The method can iteratively repeat such traffic management in real-time using measurements of each band, until the load is equalized and the congestion in all bands is resolved or minimized.

Figure 3:
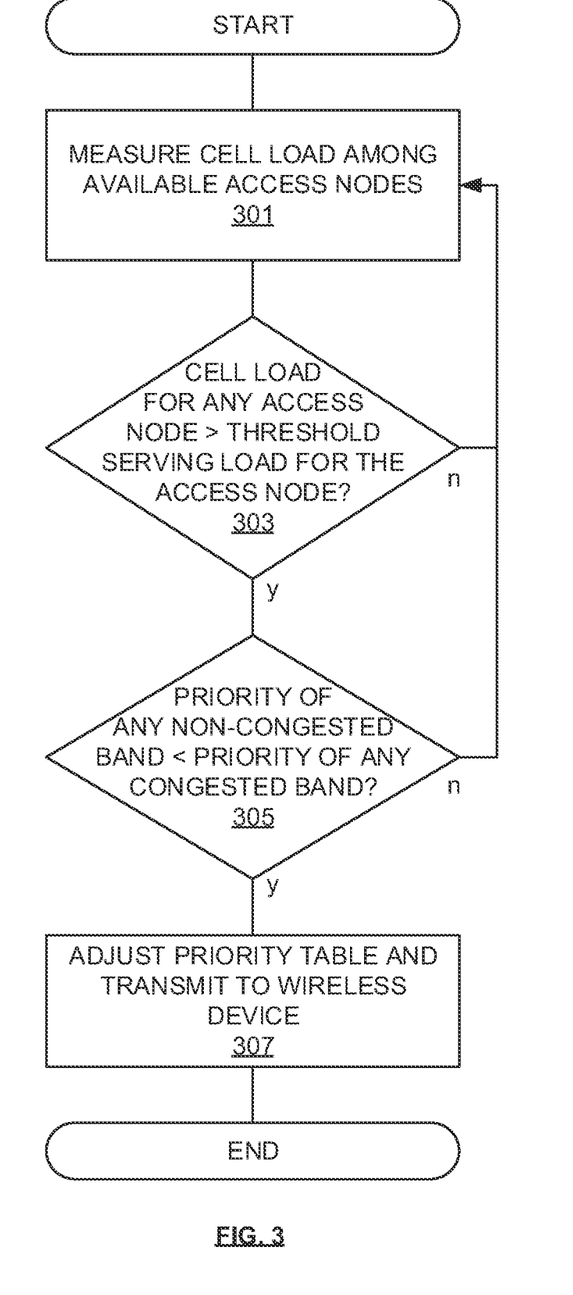
FIG. 3 illustrates an exemplary method for determining when to initiate load equalization.

FIG. 3 illustrates an exemplary method for determining when to initiate load equalization. The method will be discussed with reference to the exemplary communication system 100 illustrated in FIG. 1. However, the method can be implemented with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

The method begins at 301 with a measurement of cell load among available access nodes. As described herein, if a band is determined to be congested at a serving access node (i.e. an access node that currently serving wireless devices using the deployed band), measurements are taken of other available bands in the network to properly determine the updated priority levels. For example, load measurements such as physical resource block (PRB) utilization metrics, number of connected users, etc. may be taken. An X2 or any other interface between different access nodes in the network may be used to request load metrics from the access nodes. In either case, at 303, a determination is made as to whether the cell load for any access node or frequency band exceeds a threshold serving load for the access node. Such a determination based on the load measurements of 301 enables any access node or any other entity on network 100 to perform the disclosed operations. For example, the cell load of a particular band deployed by the serving access node may not exceed the threshold, but a cell load for the same band (or any other band) deployed by a neighboring access node may exceed the threshold. If neither cell load exceeds the threshold, the method loops back to measuring cell loads, and if at least one cell load exceeds the threshold, the method continues. Therefore the method operates in real-time, determining whether or not to perform priority adjustments based on ongoing monitoring of cell loads.

In 305, a priority level of the bands in the network is compared. For instance, a priority of a non-congested band (NB) is compared with a priority of a congested band (CB) and, if the priority of the CB is less than the priority of the NB, then it is determined that no adjustment is needed, since a wireless device resuming from idle will select the appropriate NB, and the method loops back to measuring cell loads 301. However, if the priority of the NB is less than the priority of the CB, then an adjustment is needed, otherwise the wireless device resuming from idle will select the higher-prioritized CB, thereby causing more congestion. Therefore, the method proceeds to adjusting the priority table 307 and transmitting to the wireless device (UE), as described herein.

Figure 4:
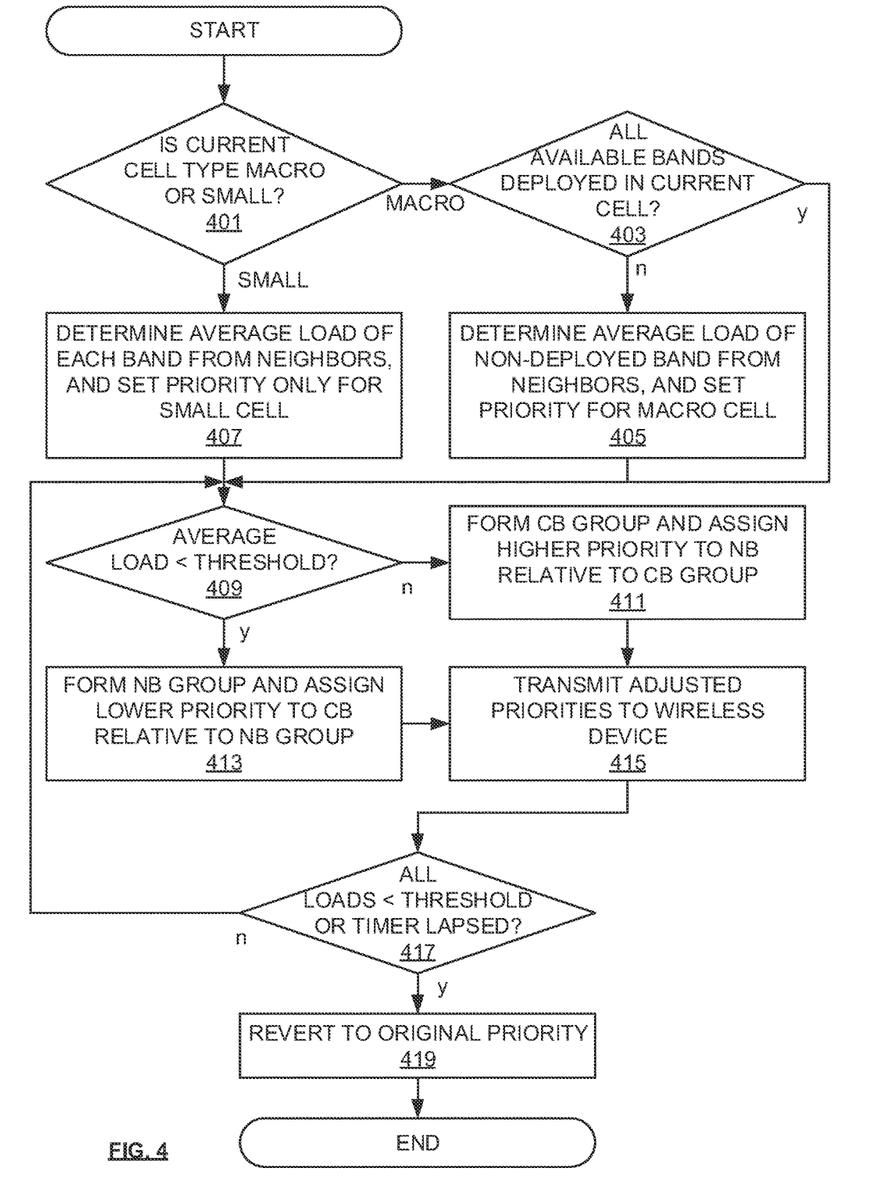
FIG. 4 illustrates an exemplary method for adjusting priorities of frequency bands for load equalization.

FIG. 4 illustrates an exemplary method for adjusting priorities of frequency bands for load equalization. Upon determining that congestion exists as described herein, and upon deciding that priority adjustment is necessary per the method of FIG. 3, this method may be executed by the exemplary communication system 100 illustrated in FIG. 1 or by entity in a suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Steps 401, 403, 405, and 407 relate to determining a type of access node where the congested band is deployed, and subsequent determinations of average loads for other bands in the network depending on the type of access node. For example, in 401, it is determined whether the current (serving) access node is a macrocell or a small cell. If it is a macro cell, then it is determined in 403 whether the macrocell has deployed all available bands, or if there are other bands not deployed by the macrocell but deployed by neighboring cells. For instance, referring to system 100, macrocell 110 has deployed all available bands, so the determination would be positive, but macrocell 120 has only deployed 2 out of 3 available bands, so the determination would be negative. For a positive determination, the method proceeds straight to load comparisons 409. However, for a negative determination, the method proceeds to 405 where the average load of any non-deployed band from a neighboring access node is measured. This measurement is required to make a proper comparison of loads in 409.

Referring back to 401, if the current access node is a small cell access node, i.e. a macrocell, picocell, or femtocell, then the method proceeds to 407, where an average load of each band deployed by neighboring cells is determined. This again is done since small cells typically only deploy one frequency band, so a comparison with other frequency bands necessitates a measurement of neighboring cell loads. Moreover, the priority in this case is set only for the small cell, which means that devices connected to the small cell are subject to the updated priorities, and the priority is not broadcast or otherwise transmitted to other access nodes, or to devices in the network that are not connected to the small cell.

In either case, in 409, the measured average load, whether of the neighbor cell (in case of the serving node being a small cell or not having deployed all the bands) or of the current cell is compared to a serving threshold. A serving threshold enables a determination of whether or not the band is congested. A serving threshold, for instance, is a threshold load above which a frequency band that is serving a wireless device is determined to be a congested band (CB). Further, if a single carrier within the frequency band is congested, the entire band is determined to be congested. Note that this load—threshold comparison is necessarily taking place after the determination in steps 303-305 of FIG. 3 that priority adjustment is necessary. Therefore, if the load is determined in 409 to be lower than the serving threshold, then a non-congested band (NB) group is formed 413, and a relative priority of the congested band (CB) is adjusted to be lower than the priority of the NB group, such that any wireless device resuming from idle is directed to connect to an NB band first. The priority adjustment follows the method shown with respect to FIG. 2 and tables 1 and 2, or any other method evident to those having ordinary skill in the art in light of this disclosure.

Alternatively, if the average load is determined in 409 to be above the threshold, then a CB group is formed 411, which include all congested bands, on the serving node and on any neighboring nodes. The priority of any NBs is adjusted in 411 to be higher than the CB group, such that any wireless device resuming from idle is directed towards connecting to the NB band first, thereby relieving congestion in bands in the CB group. Although steps 411 and 413 include forming band groups, this feature is not necessary in the case where there is only one congested band or non-congested band. Alternatively or in addition, such a group can comprise said only one congested band or non-congested band. In either case, the updated priority lists from steps 411 and 413 are transmitted in 415 to any wireless device that is about to go idle, for instance, within a connection release message.

Subsequently, the method proceeds to 417, where all loads or loads for all bands are checked against a threshold. This step determines whether or not congestion is relieved. There may be a time period between steps 415 and 417, to allow for wireless devices to resume from idle state and reconnect based on the updated priority. For instance, in some networks, wireless devices remain in an idle state for up to 30 seconds. Therefore, after a time period of 30 seconds or greater, all loads may be measured against a threshold 417 to determine whether congestion is relieved or not. If congestion is not relieved, i.e. if congested bands remain, then the method returns to CB/NB group formation, priority adjustment, and wireless device notification steps 409-415. The determination of a congestion being overcome may further rely on a second threshold that is higher than the first load threshold used to determine congestion, i.e. a hysteresis threshold. The hysteresis threshold allows for a congestion determination to exceed the first congestion determination, so as to ensure that the congestion is actually resolved, and to minimize repeated and unnecessary adjustment to the priority table. Moreover, this loop allows for real-time and ongoing load equalization based on comparison step 417. Alternatively or in addition, simply a timer is used, based on an assumption that the load equalization using the new priorities has worked. In either case, i.e. upon the load being equalized via measurement, or upon expiration of the timer, the priority reverts to the original or default priority in 419, so as to preserve the network operator's preferences.

Figure 5:
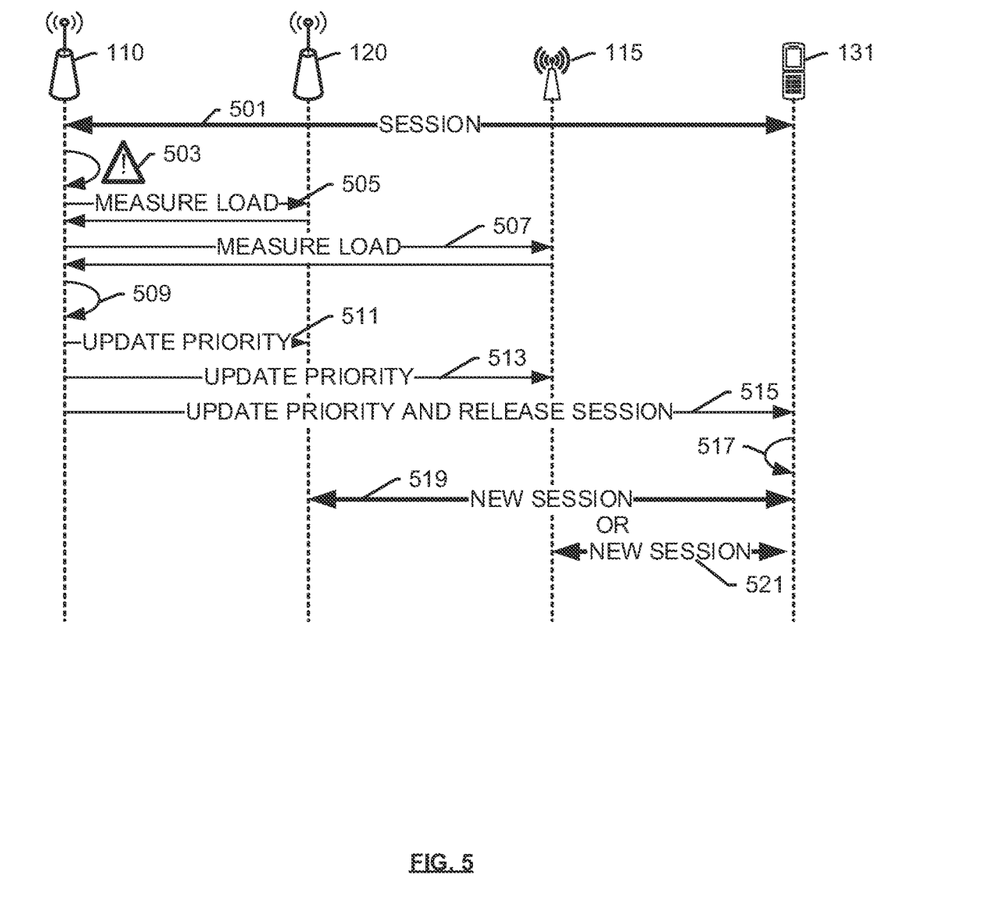
FIG. 5 illustrates an exemplary load equalization network flow.

FIG. 5 illustrates an exemplary load equalization network flow. This flow is depicted using components from exemplary communication system 100 illustrated in FIG. 1, but may be implemented in any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

An existing session 501 between access node 110 and wireless device 131 may be determined in 503 to be in a congested band. If there are other bands available in the network but not deployed by access node 110, a measurement is taken of neighboring nodes 120 and 115. The measurements 505 and 507 return values that are used by access node 110 to determine an optimal priority 509. This operation may use, for instance, the method described with respect to FIG. 4. In either case, an updated priority message 511, 513, is transmitted to each of access nodes 120, 115, via, for instance, an X2 interface between said nodes. Further, a priority list and session release is communicated 515 to wireless device 131. Wireless device 131 undergoes an idle-mode process 517, and when it resumes from idle, it uses the updated priority table to resume new sessions 519 or 521, using bands deployed by one of access nodes 120 or 115 respectively, rather than revert back to the congested band offered by access node 110.

Figure 6:
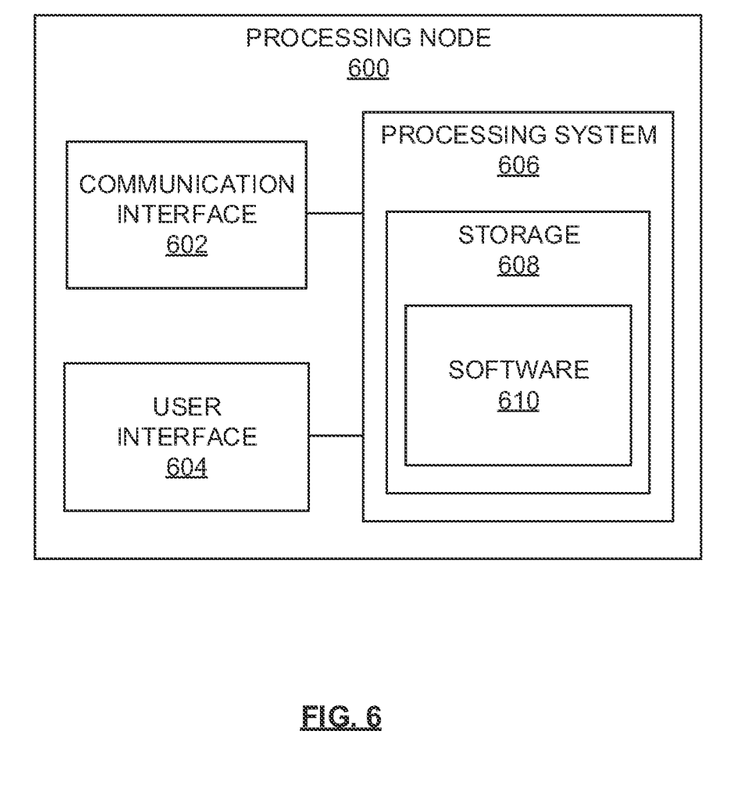
FIG. 6 illustrates an exemplary processing node.

FIG. 6 illustrates an exemplary processing node 600 comprising communication interface 602, user interface 604, and processing system 606 in communication with communication interface 602 and user interface 604. Processing node 600 is capable of paging a wireless device and communicating with access nodes via communication interface 602. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access nodes 110, 115, or 120. Processing node 600 can also be an adjunct or component of a network element, such as an element of access nodes 110, 115, 120, gateway 105, controller node 107, a mobility management entity, a gateway, a proxy node, a wireless device or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and nonremovable media, and contemplates media readable by a database, a computer, and various other network devices.

Examples of the computer-readable recording medium include, but are not limited to, read-only memory (RUM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adaptive idle-mode load equalization within a wireless network, the method comprising:
   determining that a first load of a carrier operating on a first frequency band in the wireless network exceeds a first load threshold, wherein the carrier is one among a plurality of carriers operating on the first frequency band;
   determining, based on the first load of the carrier exceeding the first load threshold, that all of the plurality of carriers operating on the first frequency band in the wireless network are congested;
   determining that the first frequency band is one of a first plurality of frequency bands that is determined to exceed the first load threshold;
   adding the first plurality of frequency bands into a congested band group;
   adjusting a cell reselection priority table such that a priority of each frequency band within the congested band group is lower than a priority of a second frequency band in the network, wherein the second frequency band is one of a second plurality of frequency bands determined not to be congested;
   adding the second plurality of frequency bands into a non-congested band group;
   adjusting the cell-reselection priority table such that a relative priority of each frequency band within the non-congested band group is increased; and
   transmitting the cell reselection priority table to a user equipment prior to the user equipment entering an idle state;
   wherein upon resuming from the idle state, the user equipment connects to the wireless network using the second frequency band.

2. The method of claim 1, wherein transmitting the cell reselection priority table to the user equipment is performed via a connection release message.

3. The method of claim 1, wherein the first frequency band is served by a serving node that is serving the user equipment.

4. The method of claim 3, wherein the serving node is a small cell that deploys only the first frequency band, wherein the second frequency band is deployed by a neighboring node, the method further comprising determining an average load of each additional band served by the neighboring node, and adjusting the cell reselection priority table to reflect the average load of said each additional band.

5. The method of claim 4, wherein the cell reselection priority table is used only for the serving node.

6. The method of claim 3, wherein the serving node is a macro cell, wherein the second frequency band is not deployed by the macro cell, and wherein the second frequency band is deployed by one or more neighboring nodes, the method further comprising: determining an average load of each band not deployed by the macro cell, and adjusting the cell reselection priority table to reflect the average load of said each band not deployed by the macro cell.

7. The method of claim 3, wherein both the first and second frequency bands are deployed by at least the serving node.

8. The method of claim 7, further comprising transmitting the cell reselection priority table to one or more neighboring nodes.

9. The method of claim 1, further comprising reverting back to a default cell reselection priority table after a time period.

10. The method of claim 1, further comprising reverting back to a default cell reselection priority table when it is determined that no congested bands remain in the wireless network.

11. The method of claim 10, the determination that no congested bands remain in the wireless network is based on a second load threshold that is higher than the first load threshold.

12. A system for adaptive idle-mode load equalization within a wireless network, the system comprising:
    a processing node configured to
       determine that a load of a carrier operating on a first frequency band deployed by a serving node in a wireless network exceeds a load threshold, wherein the carrier is one among a plurality of additional carriers operating on the first frequency band;
       determine, based on the load of the carrier exceeding the load threshold, that all of the plurality of carriers operating on the first frequency band in the wireless network are congested;
       obtain average load measurements of one or more additional frequency bands in the wireless network;
       determine, based on the average load measurements of the one or more additional frequency bands, that the first frequency band is one of a first plurality of frequency bands that is determined to exceed the load threshold;
       add the first plurality of frequency bands into a congested band group;
       define a first relative priority for the congested band group such that a priority of each of the first plurality of frequency bands is relatively lower than a priority of a second frequency band that has a smaller load from among said one or more additional frequency bands in the network, wherein the second frequency band is one of a second plurality of frequency bands determined not to be congested based on the average load measurements;
       add the second plurality of frequency bands into a non-congested band group;

define a second priority of the non-congested band group such that a priority of each frequency band within the non-congested band group is increased; and transmit the relative priority for each frequency band to a user equipment prior to the user equipment entering an idle state.

13. The system of claim 12, wherein upon resuming from the idle state, the user equipment connects to the wireless network using the second frequency band.

14. The system of claim 12, wherein defining the relative priority further comprises lowering the priority of the first frequency band.

15. The system of claim 12, wherein defining the relative priority further comprises increasing the priority of the second frequency band.

16. The system of claim 12, wherein the second frequency band is deployed by a neighboring node, wherein the processing node is further configured to transmit the relative priority for each frequency band to the neighboring node.

17. The system of claim 12, wherein the first and second frequency bands are deployed by the serving node.

18. A processing node for adaptive idle-mode load equalization within a wireless network by performing operations comprising:

determining that a first load of a first carrier operating on a first frequency band deployed by a serving node in a wireless network exceeds a load threshold, wherein the first carrier is one among a plurality of additional carriers operating on the first frequency band, and wherein the first frequency band is one among a plurality of frequency bands in the wireless network;

determining, based on the load of the first carrier exceeding the load threshold, that all of the plurality of carriers operating on the first frequency band in the wireless network are congested;

determining that the first frequency band is one of a first plurality of frequency bands that is determined to exceed the load threshold;

adding the first plurality of frequency bands into a congested band group;

lowering a reselection priority of the congested band group based on real-time load measurements of the first plurality of frequency bands;

determining that a second load of a second carrier operating on a second frequency band deployed by the serving node does not exceed the load threshold;

determining that the second frequency band is one of a second plurality of frequency bands that is determined not to exceed the load threshold;

adding the second plurality of frequency bands into a non-congested band group;

raising a reselection priority of the non-congested band group based on real-time load measurements of the second plurality of frequency bands; and transmitting the reselection priority of each of the first and second pluralities of frequency bands to a wireless device on the wireless network.

* * * * *